ND STATES

United States Patent [19]

Terashita

[11] Patent Number: 4,577,961
[45] Date of Patent: Mar. 25, 1986

[54] PHOTOMETRIC CONDITION CORRECTING METHOD FOR PHOTOGRAPHIC FILM

[75] Inventor: Takaaki Terashita, Kaisei, Japan

[73] Assignee: Fuji Photo Film Co., Ltd., Ashigara, Japan

[21] Appl. No.: 545,195

[22] Filed: Oct. 25, 1983

[30] Foreign Application Priority Data

Nov. 2, 1982 [JP] Japan .............................. 57-192824

[51] Int. Cl.$^4$ ............................................. G03B 27/32
[52] U.S. Cl. .......................................... 355/77; 355/38
[58] Field of Search ..................... 355/38, 77, 78, 40; 430/359, 30; 354/20; 356/425

[56] References Cited

U.S. PATENT DOCUMENTS

| 4,211,558 | 7/1980 | Oguchi et al. ............. 355/78 X |
| 4,274,732 | 6/1981 | Thurm et al. ................... 355/38 |
| 4,335,956 | 6/1982 | Findeis et al. .............. 355/77 X |
| 4,464,045 | 8/1984 | Findeis et al. .................. 355/38 |

Primary Examiner—Richard A. Wintercorn
Attorney, Agent, or Firm—Wenderoth, Lind & Ponack

[57] ABSTRACT

When printing a photographic film, it is necessary to determine exposure conditions by judging from the conditions of a picture image of an object. However, if the object is analyzed by photometrically measuring it at the developing stage of the negative film, it is impossible to discriminate whether the result of the analysis is attributable to the object per se or the fluctuation in film developing process. According to this invention, a film property printed portion is exposed at a predetermined location on a film beforehand for identification of the film properties, the portion being measured for the density at the time of printing, comparing the measured density with a standard value, correcting the photometrical conditions on both surfaces of the film.

9 Claims, 6 Drawing Figures

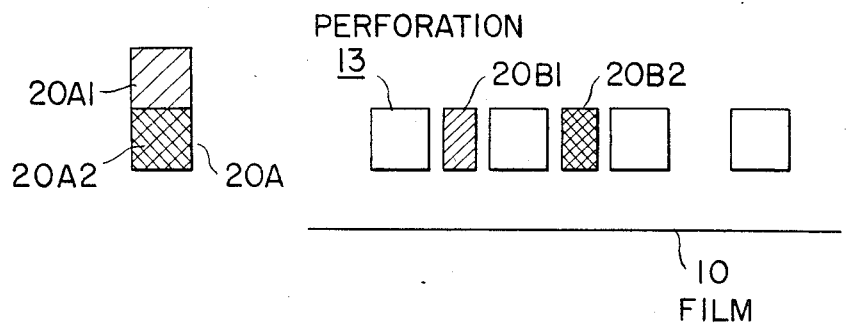
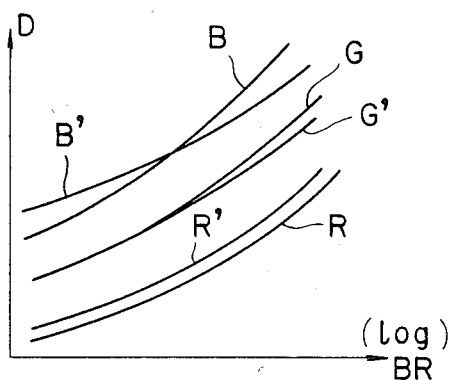
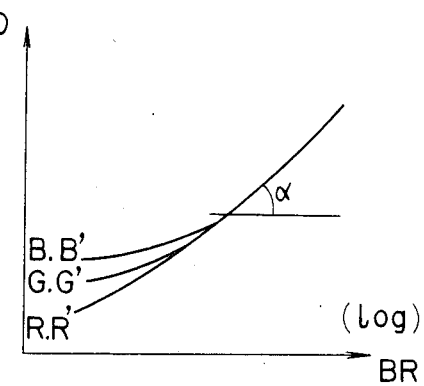

PHOTOMETRIC CONDITION CORRECTING METHOD FOR PHOTOGRAPHIC FILM

BACKGROUND OF THE INVENTION

The present invention relates to a method of correcting photometric conditions for a photographic film.

FIG. 1 shows the conventional method to determine exposure conditions when picture frames of a photographic film are scanned so that photometric values are analyzed to obtain appropriate prints. The prior art comprises taking a picture of an object 1 on a film 2, photometrically measuring 4 the film at the stage of development process 3, analyzing 5 the object 1 and estimating a picture image of the object 1 from the result of the analysis 5 thereof for determination of exposure conditions. In the prior art, however, it is difficult to discriminate whether the result of the analysis is attributable to the object 1 itself or to the fluctuation at the stages of the film 2 and the development process 3 as the data related to the fluctuation in the film 2 as well as the development process 3 is outputted, too, even though the analysis on the object 1 itself is conducted at the analyzing stage 5.

There has never been proposed any effective method to correct photometric conditions in order to solve such problems. There has been proposed a method (Japanese Patent Laid-open No. 13333/1977) of adjusting directly an exposure control unit which comprises photographing an illumination light source in advance between one picture frame and another, and controlling the printing conditions by making the location a predetermined color. Since the light source photographed on the film according to this method is not the light source to illuminate the object but includes reflected light from the background, the method is not very satisfactory in precision although it has a higher precision compared to the method using average density of the whole film area. Another method (e.g. Japanese Patent Laid-open No. 129335/1980) has been proposed which exposes a predetermined color synthetic mark on an unexposed location of a film before development in order to identify the type of the film and measures it with a 6-color filter. But this method is defective in that the equipments unavoidably become very complex and the measuring operation is extremely difficult.

SUMMARY OF THE INVENTION

Accordingly, an object of the present invention is to provide a novel method which accurately corrects photometric conditions of a photographic film, and more particularly which accurately modifies the sensitivity correction and in which $\gamma$-correction is relatively simple operation.

Another object of the present invention is to provide a method of correcting photometric conditions on picture frames of a film by measuring the density of a film property printed portion which has been exposed at a predetermined location on a film.

Still another object of the invention is to propose an appropriate exposure location for the film property printed portion which is suitable for measuring the film photometrically.

The nature, principle and utility of the invention will become more apparent from the following detailed description when read in conjunction with the accompanying drawings.

BRIEF DESCRIPTION OF THE DRAWINGS

In the accompanying drawings:

FIGS. 3A and 3B are views to respectively show other embodiments of the film property printed portions according to this invention; and FIGS. 4A and 4B are views to explain standardizing process according to this invention.

DETAILED DESCRIPTION OF THE INVENTION

Figure 1:
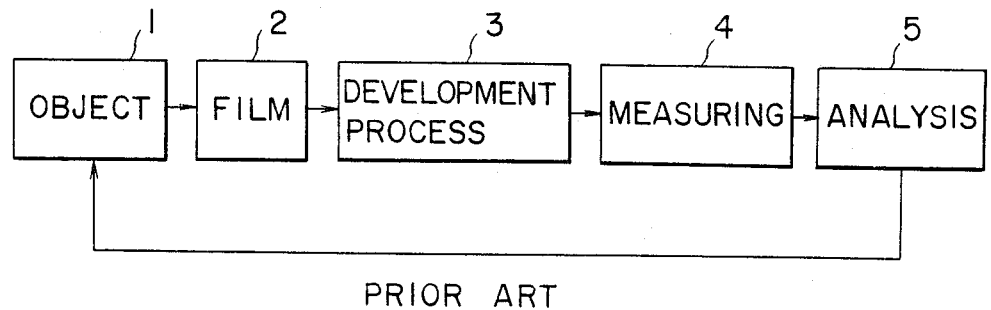
FIG. 1 is a block diagram to show the conventional aspect of analysis of an object.
Figure 2:
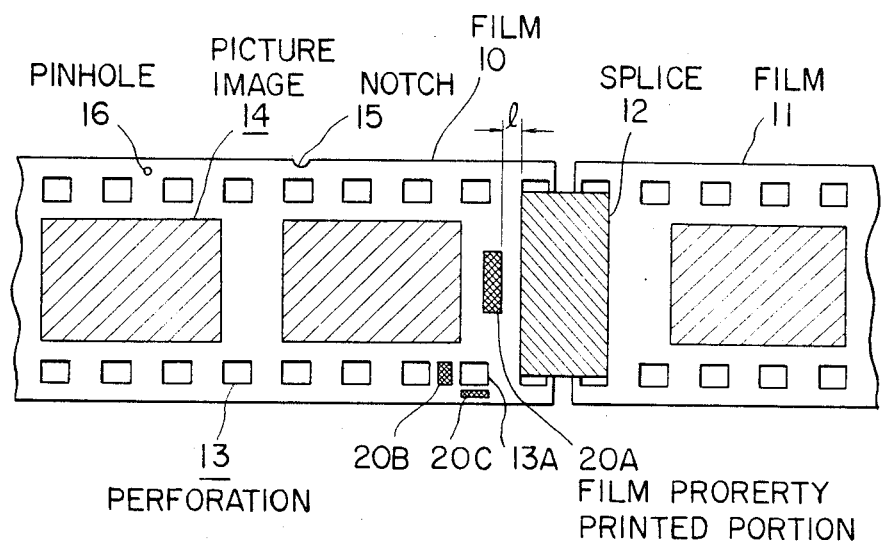
FIG. 2 is a diagram to show the embodiments for forming of the film property printed portion according to this invention.

As shown in FIG. 2, a film property printed portion 20A is formed by exposing a rectangle (e.g. 2×3 mm) at an unexposed location of a film 10 which is apart by a predetermined distance l from a splice 12 which connects ends of two films 10 and 11 before developing the films. A rectangle (e.g. 2×2 mm) may be exposed between perforations 13 on the film 10 to form a film property printed portion 20B or alternatively, a rectangle (e.g. 1×2 mm) may be exposed at a location between a perforation 13 and the side end of the film 10 to form a film property printed portion 20C. It is possible to expose arbitrarily a film property printed portion on unused portion of the film 10 but it is desirable to set the location so that it has a predetermined distance from the tip end of the negative film 10 to facilitate photometric operation. If the location for the film property printed portion is to be determined using the perforations 13 as a criteria, it is preferable to expose on the base of the first perforation 13A in respect of the tip end of the film 10. The shape of the film property printed portions 20 (20A to 20C) is preferably of a rectangle of at least 1 mm square or larger. It is further preferable to have film property printed portions of identical shapes in a number of 2 or more and in an area as large as possible in order to raise precision and to avoid fogging. The exposure amount for forming such film property printed portions may be substantially equal for colors of R (red), G (green) and B (blue) so as to make the density after the development becomes medium density which is near to gray. Or it may be the amount to effect two degrees of densities or several degrees thereof. In the case of exposing it at two degrees of densities, a film property printed portion 20A may be formed in a region of a higher density 20A2 and that of a lower density 20A1 which are adjacent to each other as shown in FIG. 3A. In the case of forming the portion at a location between perforations 13, 13 as shown in FIG. 3B, it may be formed with a region of a higher density 20B2 and that of a lower density 20B1 which are of the same shape.

The film property printed portion 20 thus exposed and formed on an unexposed location of the film 10 will be photometrically measured after development by a hue extraction unit (for instance, the one disclosed in Japanese Patent Laid-open No. 145620/1978). For the film property printed portion 20A shown in FIG. 2, the scanner used for photometric measuring of the film picture image 14 can be used without modification. As the portion 20A is apart from the splice 12 by a predetermined distance l (e.g. 2 mm), it is possible to photometrically measure only the very location after detecting the splice 12 with timing. In the case of the film property printed portions 20B and 20C shown in FIG. 2, an exclusive photometry device separated from the scanner may be mounted along the travelling route of the films 10 and 11 and above the portions 20B and 20C.

As described above, the film property printed portion 20 which has been exposed and formed before development of the film 10 is photometrically measured before printing in order to obtain the data thereof. As the film property printed portion 20 has been exposed with a predetermined exposure amount, it is possible to determine with a higher precision the property of the film 10 by measuring the portion 20 photometrically.

After obtaining the photometric data of the portion 20 in the manner described above, the hue extraction unit is used to correct the difference in development process as well as in the types of films so that the film property can be standardized to have a constant sensitivity balance or a γ-value. The standarization process may be conducted according to, for instance, the method disclosed in Japanese Patent Laid-open No. 1039/1981 which corrects the γ-value, which indicates the relation between the exposure amount and the density, and the sensitivity balance which varies depending on the types of color original pictures or the development conditions. In other words, even if the same object is photographed under the same conditions, R, G and B densities will assume different values in films having different properties as shown in FIG. 4A. The present invention enables the density D to become a constant value if an object is photographed under the same conditions disregarding the film types and developmental conditions as shown in FIG. 4B, whereby the hue can be judged precisely. The X-axes BR in FIGS. 4A and 4B express the luminance of an object in logarithm. (R, G, B) and (R', G', B') denote two different film properties.

The standardizing conditions in sensitivity correction values and γ-correction value are set for standard developmental conditions, film type, and lot number. Simultaneously standard values $DH_o$ and $DL_o$ for a higher and a lower densities are obtained in the case of the film property printed portion shown in FIG. 3A or 3B. Then, the data of the film property printed portion formed on each film is obtained in the expression of the higher density $DH_i$ and the lower density $DL_i$, and the density difference ΔD from the standard value $DL_o$ is obtained by the formula below:

$$\Delta D = DL_i - DL_o \quad (1)$$

Further the ratio Δγ in inclination of the γ-value is obtained by the formula below:

$$\Delta\gamma = \frac{DH_i - DL_i}{DH_o - DL_o} \quad (2)$$

The difference Δγ' in inclination of the γ-value is obtained by the formula below:

$$\Delta\gamma' = (DH_i - DL_i) - (DH_o - DL_o) \quad (3)$$

In the manner described above, when the correction value ΔD, the sensitivity correction value for correcting analyzing properties of a photographic film and the correction value Δγ (or Δγ'), of γ-value are obtained, the data for respective films is corrected from the standardizing conditions by using above mentioned correction values ΔD and Δγ (or Δγ') at the scanning time of the picture images recorded on the photographic film.

The data can be corrected rapidly according to the photometric condition correction method of this invention as the conditions are corrected for one film instead of each frame of the film. As a film property printed portion is formed by exposing a predetermined location of a film in a predetermined shape by each processing laboratory instead of using a camera, the method does not require any special cameras. Errors are often caused in hue extraction by chronological changes in developing process, chronological changes in films, types of films, variety of lot numbers, etc. For instance, when a flesh color is extracted, it is quite often mistaken by a neutral color (gray). But by using the method according to this invention, the fluctuation mentioned above can be effectively corrected, thereby enabling to extract the hue accurately. The method according to the present invnetion can raise the precision in estimation for analyzing object picture image because it can provide accurate input values from determining the exposure amount for color film print. It is also advantageous since if the corrected value ΔD of the sensitivity correction values is large, that can be used for detecting the type of the film and the live chronological changes. The above description concerns the correction of the photometric conditions in scanning picture frames of a film. The similar effect can be obtained in corrected photometric values by adding/subtracting or dividing/multiplying a correctional value to/from respective photometric values instead of correcting the photometric conditions.

The hue extraction unit may be incorporated in a color printer. Or a film is formed with a notch 15 or a pinhole 16 as shown in FIG. 2 simultaneously at the time of exposure and a film property printed portion is exposed at a location apart from the notch 15 or the pinhole 16 by a predetermined distance for easier registration. The exposure may be conducted in a splicer or in a film insertion portion in a developing processor. Alternatvely, a special and separate exposing device may be provided between a splicer and a developing processor. Further, an elongated notch may be provided along the end of the perforation on a film at the manufacturing stage so that a space can be reserved for forming a splice and for printing a film property printed portion. It is desirable that film property printed portion may be provided in space reserved thereof in the cases of a film of 110 size or a film of a disc size. Although FIG. 2 shows an example wherein two films 10 and 11 are connected with a splice 12, the number of films may be arbitrarily selected. The method is applicable for one film in the case of forming such portion at a location with a predetermined distance from the end of the perforation of the film. Although the explanation is given in the foregoing for the case where the tip end of the film comes first to the photometric position, it does not necessarily mean the tip end at photography.

What is claimed is:

1. A photometric condition correcting method of the type comprising measuring and analyzing B, G and R densities of a piece of photographic film and determining print exposure values therefrom comprising the steps of:

measuring the density of a portion printed in advance of a film by a film property printing means;
  comparing the measuring value with a standard value;

calculating correction values of sensitivity correction values and correction value of $\gamma$ value for respective films; and correcting the photometric conditions on images of the film.

2. A photometric condition correction method as claimed in claim 1, further comprising the step of connecting said piece of photographic film with another piece of film by means of a splice and perforating the film at predetermined intervals.

3. A photometric condition correction method as claimed in claim 2, further comprising the step of forming the printed portion after the splice has been affixed to the films.

4. A photometric condition correction method as claimed in claim 1, further comprising the step of forming the printed portion is formed when the film is developed.

5. A photometric condition correction method as claimed in claim 1, further comprising the step of forming the printed portion so as to have plural degrees of density.

6. A photometric condition correction method as claimed in claim 1, further comprising the step of correcting the measured value due to the corrected photometric conditions.

7. A photometric condition correction method as claimed in claim 6, further comprising the step of providing the corrected photometric conditions in digital form.

8. A photometric condition correction method as claimed in claim 6 further comprising the step of providing the corrected photometric conditions in analog form.

9. A photometric condition correction method as claimed in claim 4, further comprising the step of utilizing the corrected value for the analysis of the object image.

* * * * *